No. 648,032. Patented Apr. 24, 1900.
E. JANESCH.
TANK HEATER AND FEED COOKER.
(Application filed Nov. 13, 1899.)
(No Model.)
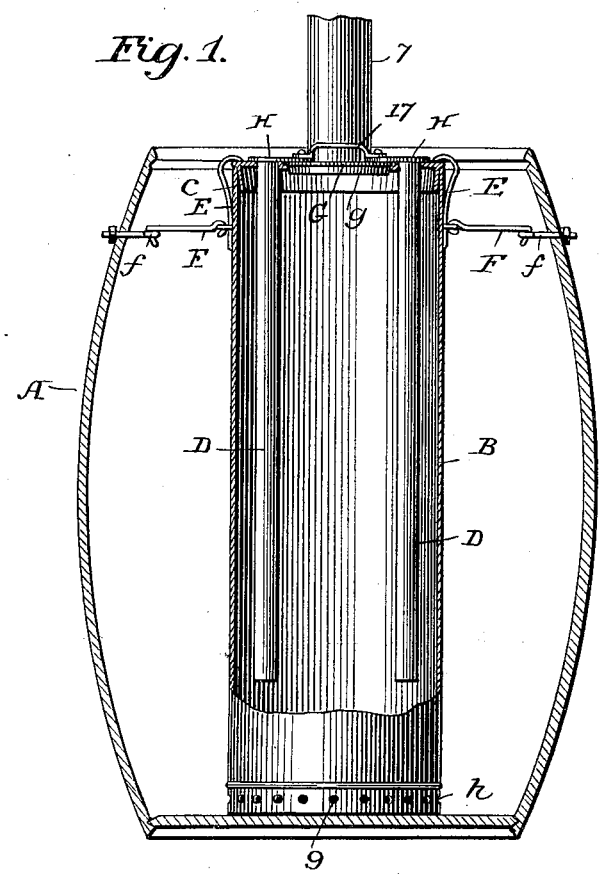
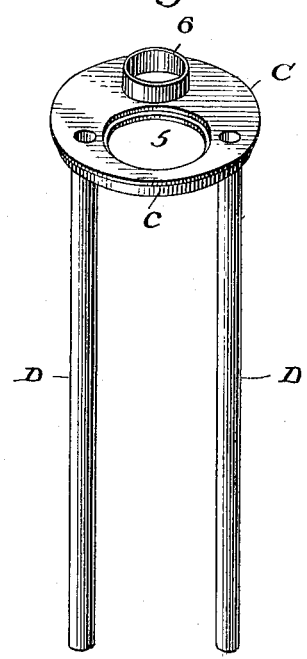
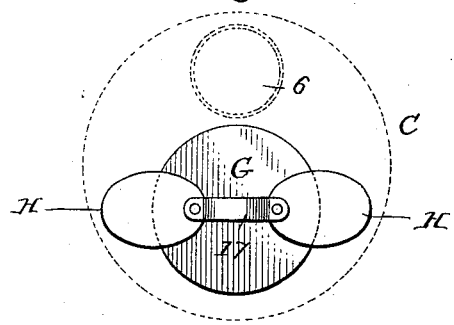
Witnesses
J. G. Hinkel
H. M. Gillman, Jr.
Inventor
Edward Janesch
by Foster Freeman
Attorneys
THE NORRIS PETERS CO., PHOTO-LITHO., WASHINGTON, D. C.

UNITED STATES PATENT OFFICE.

EDWARD JANESCH, OF LINCOLN, NEBRASKA.

TANK-HEATER AND FEED-COOKER.

SPECIFICATION forming part of Letters Patent No. 648,032, dated April 24, 1900.

Application filed November 13, 1899. Serial No. 736,850. (No model.)

*To all whom it may concern:*

Be it known that I, EDWARD JANESCH, a citizen of the United States, residing at Lincoln, in the county of Lancaster and State of Nebraska, have invented certain new and useful Improvements in Tank-Heaters and Feed-Cookers, of which the following is a specification.

This invention relates to feed-cookers, particularly of that class designed to be placed inside of a barrel or other receptacle and to be surrounded by the substance it is desired to cook; and the object of the invention is to simplify and improve the construction of heaters employed for this purpose.

The invention will be fully described hereinafter, reference being had to the accompanying drawings, in which—

Figure 1 is a sectional elevation of a heater or cooker constructed in accordance with my invention, the same being shown in position in a receptacle. Fig. 2 is a plan of the lid and dampers for closing the fuel-opening and for regulating the air-supply. Fig. 3 is a perspective view of the detachable top cover and the air-supply pipes connected to it.

The receptacle for the feed or other substance to be heated is indicated by A and is shown in the form of a barrel. It may, however, be of any other form, as desired. The cooker or heater consists of a vessel B, preferably cylindrical and closed at its lower end and provided with a removable top cover C, to which is firmly secured the air-supply pipes D in such manner that they move together. The top cover is provided with an opening 5, through which fuel is supplied to the heater, and with a stovepipe-collar 6, to which the pipe 7, of any desired length, may be detachably connected in the usual manner. As shown, the air-supply pipes D are arranged at opposite sides of the opening 5, and they are at substantially-equal distances from the exit-flue. Preferably the top cover C will be provided with a depending flange $c$ within its edge to fit snugly within the end of the heater, and its edge will rest upon the edge of the vessel B, as shown in Fig. 1, and practically an air-tight joint is formed; but at the same time the cover can easily be removed from the heater. Some means for holding the cover in position must be used, and for this purpose I preferably employ hook-catches E, which are connected to the vessel B in such manner that they will securely clamp the top cover in position, but may be readily disengaged therefrom when it is necessary to remove the cover. Other hooks F are pivotally connected to the vessel near its upper end and are adapted to be detachably engaged with eyes $f$, secured to the receptacle A, such hooks being for the purpose of securing the heater in position within the receptacle holding the feed.

The lid for closing the fuel-opening 5 is indicated by G, and, as shown, is provided with a central depending portion $g$ within its edge, said portion fitting loosely within the opening 5, so as to permit the lid G to be turned about its central axis without removing it from the opening 5. To facilitate the turning of the lid, it is provided with a handle 17. Firmly secured to the lid G to move therewith are two valves or dampers H H, adapted, respectively, to fit over the upper ends of the air-pipes D, and it will be readily seen that by turning the lid G the said dampers or valves H may be caused to partially or entirely close the pipes D or to leave them entirely open, and as the valves are uniform in size and so arranged as to act uniformly in the opening or closing of their respective pipes it is obvious that the air-supply to the fuel will be uniform down both pipes and the combustion of the fuel will also be uniform.

In the drawings I have illustrated two air-pipes D; but it is obvious that three or more pipes might be employed, and also that as many valves or dampers as there are air-pipes may be secured to the lid G.

The vessel B is provided with a flange $h$, extending below the bottom of the vessel, and this flange is perforated, as indicated by 9, to permit water to circulate below the bottom of the heater.

From the foregoing description it will be seen that a heater constructed in accordance with my invention is exceedingly simple in construction and may be taken apart with the greatest ease when necessary to remove ashes or otherwise cleanse or repair it. No fuel-magazine is required. The air for combustion is uniformly delivered to the fuel at different points, and the closure for the fuel-opening serves as a pivot about which the air-regulating dampers or valves turn, so that the air-supply through the several pipes is always uniform and may be regulated with great facility. By dispensing with the magazine and delivering air uniformly to a plurality of points near the lower end of the vessel I am enabled to have a much stronger fire than is possible where a magazine is employed, and consequently the cooking is effected in much less time. Furthermore, the heat from the fire is distributed over a greater area and economy in fuel results.

Having described the invention, I claim—

In a feed-cooker, a vessel closed at its lower end, combined with a removable cover provided with an exit-flue and carrying air-inlet tubes placed at substantially-equal distances from said exit-flue, the cover also provided with a fuel-hole located between the inlet-tubes, and a lid for said hole carrying rigidly-attached dampers for said tubes, substantially as set forth.

In testimony whereof I have signed my name to this specification in the presence of two subscribing witnesses.

EDWARD JANESCH.

Witnesses:
WILLIAM GRAY,
WILLIAM A. WAY.